Aug. 1, 1939.  C. GAUSMANN  2,168,122

PISTON PUMP

Filed Jan. 12, 1938

Inventor:
Carl Gausmann
by Michaelis & Michaelis
Attys.

Patented Aug. 1, 1939

2,168,122

UNITED STATES PATENT OFFICE 2,168,122

PISTON PUMP

Carl Gausmann, Dessau, Anhalt, Germany, assignor to Junkers Flugzeug-und-Motorenwerke Aktiengesellschaft, Dessau, Anhalt, Germany Application January 12, 1938, Serial No. 184,667
In Germany January 27, 1937

3 Claims. (Cl. 184—6)

My invention relates to piston pumps and more especially to pumps for conveying liquids such as gasoline or the like, which have no lubricating action. In this type of pumps, in which the pistons are reciprocated by means of a crank shaft, lubricant has been fed to the crank case under pressure for the purpose of lubricating the moving parts and of preventing non-lubricant liquid from entering the crank case. To this end the crank case of the pump has been connected to a source of oil under pressure, for instance to the lubricant circulation of an internal combustion engine supplied by the pump with liquid fuel. In order to prevent oil from flowing back from the crank case of the pump and fuel from trickling through between the pump piston and the cylinder into the crank case and into the lubricant circulation of the engine, when the pressure should drop in the lubricant feed pipe, for instance when stopping the engine, a check valve of the disk valve type has been inserted between the crank case and the pressure oil feed. The use of such a check valve is however inadvisable for the following reasons: The volume of the crank case filled with oil under pressure does not remain constant during the operation of the pump, but changes in dependency upon the position of the crank shaft. A similar change of volume occurs not only in single piston pumps, but also, to a certain extent, in multi-piston pumps, the pistons of which are connected to cranks arranged in uniform staggered relation, since for equal crank angles the distances traveled by the pistons during the working and return strokes are of different length. Consequently, when the volume of the crank case is reduced, the lubricant in the crank case has a tendency to flow back into the feed pipe, being however prevented from doing so by the instantaneously closing check valve which prevents its escape from the crank case. However since this oil is practically not compressible, even slight changes of volume give rise to very high pressures which create a high power consumption of the pump and may in some cases even lead to destruction of the crank case. Apart therefrom the permanent opening and closing of a check valve of this kind in rapid succession leads to an early wear of the valve seat and requires constant repair.

It is an object of this invention to provide means for avoiding the flowing back of liquid from the crank case, supplied with oil under pressure, of piston pumps which does not involve the drawbacks mentioned above.

According to this invention this end is attained by the following means.

The spring actuated valve body of a check valve inserted in the pressure oil feed and closing in a direction counter to the direction of flow of the oil is connected to a control piston which is arranged for reciprocation in a closed cylindrical chamber, one end of which communicates with the pressure oil supply, while the other end communicates with the crank case.

The chamber further communicates by means of another conduit with the crank case, this conduit being controlled by an edge of the piston in such manner that communication through this conduit is established whenever the pressure in the liquid supply pipe, which acts on the piston, is greater than both the pressure in the crank case and the force of the valve spring, the conduit being closed by the piston, whenever the latter combination of forces exceeds the pressure in the supply pipe.

In the drawings affixed to this specification and forming part thereof a twin piston pump embodying my invention is illustrated diagrammatically by way of example.

In the drawing

Figure 1:
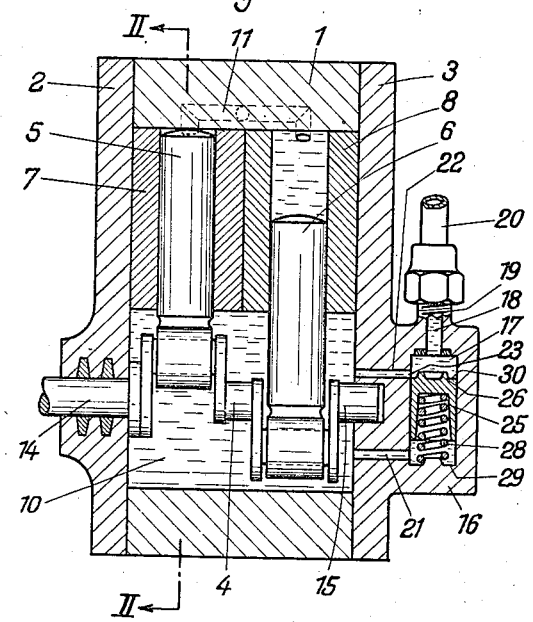
Fig. 1 is an axial section on the line I—I in Fig. 2, illustrating the means for preventing oil under pressure from flowing back from the crank case in the operative position.

Referring to the drawing, 1 is the circumferential wall and 2 and 3 the side walls forming the pump casing, 4 is the crank shaft, 5 and 6 the two pump pistons pivoted to this shaft and 7 and 8 are the roller-shaped cylinder bodies which are located for angular reciprocation in a hollow cylindrical cavity 9 of the circumferential wall 1 of the casing, which is closed in at each end by the side walls 2 and 3. These cylinder bodies are formed with diametrically extending borings, in which the pistons 5 and 6 are free to reciprocate. In the wall of the cavity 9 are formed exhaust conduits 11 and 12, respectively, for the liquid to be conveyed, these conduits being so arranged that when the pistons 5 and 6 are on their outward stroke, the conduits 11, and during their inward stroke the exhaust conduits 12 are placed in communication with the working chamber of the pump. The crank shaft 4 is accommodated in a cavity 9, the ends of the shaft being supported in bearings formed in the lateral walls 2 and 3, respectively. An extension 14 of the shaft projects through the wall 2, while a journal 15 at the other end is supported in the side wall 3. This wall is formed with a projection 16 formed with a cylindrical cavity 17 which is connected at one end by means of a conduit 18 with the connecting branch 19 for the oil feed 20, while its other end is connected by means of two conduits 21 and 22 with the crank case 10. The outer end 23 of conduit 22 is arranged in the wall of the cavity 17 between the ends of the conduits 18 and 21. In the cavity 17 a piston 25 is located for reciprocation, its head being acted upon by the pressure in the oil feed 20, while its rear side is exposed to the pressure in the crank case 10. At the end of the piston 25 facing the conduit 18 a valve dish 26 is formed which, when the piston is forced towards the conduit 18 by the pressure spring 28, which is inserted between the bottom 29 of the cavity and the bottom of the piston 25, can apply itself against the valve seat 31 provided at the top end 27 of the cavity 17 in such manner, that the inner end of the oil feed conduit 18 is covered.

Figure 1A:
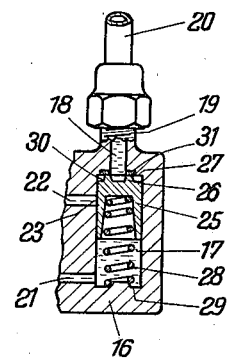
Fig. 1a is another illustration of a similar kind, but drawn to a slightly larger scale, of the same device, however in its position of rest.
Figure 2:
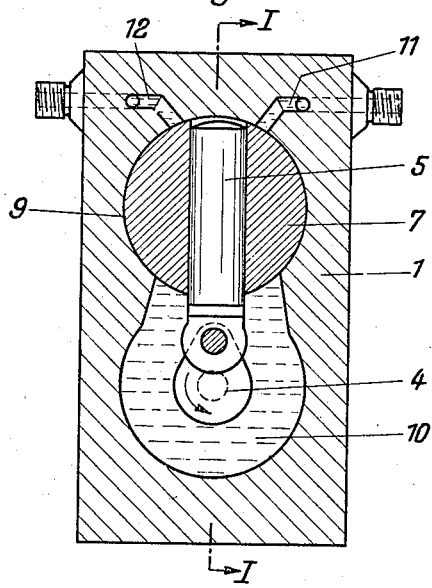
Fig. 2 is a cross section of the pump on the line II—II in Fig. 1.

The operation of this pump is as follows: Assuming first that there is no pressure in the feed pipe 20, then no pressure acts on the side of the piston 25 facing the top end 27 of the cavity 17, so that the spring 28 can shift the piston in the direction towards the end face 27 and can force the valve dish 26 onto its seat 31 (as shown in Fig. 1a). The piston now covers the opening 23 of conduit 22. If pressure is now generated in the pipe 20, a force will act on the piston head, which will ultimately overcome the pressure exerted by the spring 28 and will then force the piston 25 back into the position shown in Fig. 1, in which the control edge 30 of the piston uncovers the inner end 23 of the conduit 22. Oil under pressure can now flow through pipe 20, conduit 18, cavity 17 and conduit 22 into the crank case 10, so that after a short period of time about the same pressure will prevail in the crank case 10 as in the pipe 20. If, during the operation of the pump, the volume of the crank case 10 changes and consequently the pressure of the liquid in the crank case rises, part of this liquid is first forced out through the conduits 21 and 22. The liquid issuing from the conduit 22 flows through the cavity 17 and conduit 18 into the feed pipe 20 without being able to bring about any material increase of pressure in the part of the cavity 17 in front of the piston 25. In contradistinction thereto the liquid issuing from conduit 21 into the part of the cavity 17 below the piston 25 will cooperate with the spring 28 to force the piston towards the top end 17 of the cavity and the control edge 30 of the piston will now cover the inner opening 23 of conduit 22, so that now no liquid can flow through this conduit into the feed pipe 20. The reduction of the crank case volume, which proceeds in proportion as the crank shaft continues rotating, is compensated by a corresponding displacement of the piston 25. In order now to prevent the valve dish 26 from being forced against its seat 31 whenever the piston 25 is shifted into closing position, which would be accompanied by an early wear and knocking of the valve, the cavity is so dimensioned and the inner end 23 of conduit 22 so arranged that the volume of the part of cavity 17 which extends between the openings of the conduits 18 and 22, is larger than the volume of the quantity of liquid which, on the opening 23 being covered by the piston 25, is expelled through the conduit 21 while the pump continues its operation. On the crank shaft 4 continuing its rotatory movement, the volume of the crank case will rise again, so that the piston 25 is reversed again and the opening 23 uncovered. This play of the piston is repeated in quick succession and only if the pressure in the feed pipe 20 disappears, for instance when the internal combustion engine driving the pump is stopped, the piston will be shifted again by the spring 28 into the position shown in Fig. 1a.

I wish it to be understood that I do not desire to be limited to the exact details of construction shown and described for obvious modifications will occur to a person skilled in the art.

I claim:

1. In a pump in combination a pump casing, a pump cylinder in said casing, a pump piston reciprocable in said pump cylinder, a crank shaft associated with said pump piston and a crank case accommodating said shaft, a valve chamber and two axially spaced conduits connecting said chamber with said crank case, a liquid feed pipe and a feed conduit connecting said feed pipe with said valve chamber, a valve body forming a piston axially reciprocable in said valve chamber and adapted to control the connecting conduit adjoining said feed conduit, a spring tending to force said valve body towards and into closing position relative to said feed conduit and to the connecting conduit adjoining same, the volume of the part of said valve chamber extending between said feed conduit and the connecting conduit adjoining same being larger than the reduction of volume of the interior of the crank case resulting in the rotation of said crank shaft after said last mentioned connecting conduit has been covered by the valve body.

2. The pump of claim 1, in which a dish is formed on the valve body, said dish being arranged to close the feed conduit.

3. The pump of claim 1, in which the valve chamber is formed in an integral extension of the pump casing.

CARL GAUSMANN.